US006147624A

United States Patent [19]
Clapper

[11] Patent Number: 6,147,624
[45] Date of Patent: Nov. 14, 2000

[54] METHOD AND APPARATUS FOR PARKING MANAGEMENT SYSTEM FOR LOCATING AVAILABLE PARKING SPACE

[75] Inventor: Edward O. Clapper, Tempe, Ariz.

[73] Assignee: Intel Corporation, Santa Clara, Calif.

[21] Appl. No.: 09/495,205

[22] Filed: Jan. 31, 2000

[51] Int. Cl.[7] .......... B60Q 1/48

[52] U.S. Cl. .......... 340/932.2; 340/905; 340/995; 340/937; 340/825.28; 340/593; 340/928

[58] Field of Search .......... 340/932.2, 905, 340/995, 937, 825.28, 539, 928

[56] References Cited

U.S. PATENT DOCUMENTS

| | | | |
|---|---|---|---|
| 5,432,508 | 7/1995 | Jackson | 340/932.2 |
| 5,748,107 | 5/1998 | Kersken et al. | 340/905 |
| 5,751,973 | 5/1998 | Hassett | 395/213 |
| 5,877,704 | 3/1999 | Yoshida | 340/932.2 |
| 5,910,782 | 6/1999 | Schmitt et al. | 340/995 |
| 5,940,481 | 8/1999 | Zeitman | 379/114 |

*Primary Examiner*—Daniel J. Wu
*Assistant Examiner*—Tai T. Nguyen
*Attorney, Agent, or Firm*—Trop, Pruner & Hu, P.C.

[57] ABSTRACT

Available spaces in a system may identified using detectors in each of the spaces. The detectors may communicate the availability of a space after detecting whether or not an item is currently situated at the space. This information may be assembled and displayed using mapping software to indicate available spaces. In addition, a user may be provided with information about how to traverse through the system of spaces to locate the available space. In one embodiment of the present invention, the available spaces are parking spaces and the user is a vehicle operator having an in-car personal computer system. An in-car personal computer systems may have a display showing a map of the parking facility, indicating an available space and providing directions to reach that space.

24 Claims, 4 Drawing Sheets

METHOD AND APPARATUS FOR PARKING MANAGEMENT SYSTEM FOR LOCATING AVAILABLE PARKING SPACE

BACKGROUND

This invention relates generally to systems for identifying available space and for providing that information to entities that need available space.

In a number of applications, space is at a premium. One such application is the allocation of parking spaces. For example, in airport parking systems, a large number of spaces may be spread over a large area including various floors of a parking garage. In times of high use, it is very difficult for users to locate available parking spaces. In some cases, drivers may circle through parking garages and around parking spaces for considerable time attempting to locate available parking spots. This presumably leads to frustration for the vehicle drivers and to loss of revenues for parking lot operators.

In a number of other applications, limited space may be available in a relatively complex storage system. The ability to quickly locate available storage space may result in economies for storage operators.

Thus, there is a need for an automated system for locating available space.

SUMMARY

In accordance with one aspect, a system includes a detector to detect the absence of an item in an available space. A transmission system transmits the information about an available space. A display displays the information.

Other aspects are set forth in the accompanying detailed description and claims.

DETAILED DESCRIPTION

Figure 1:
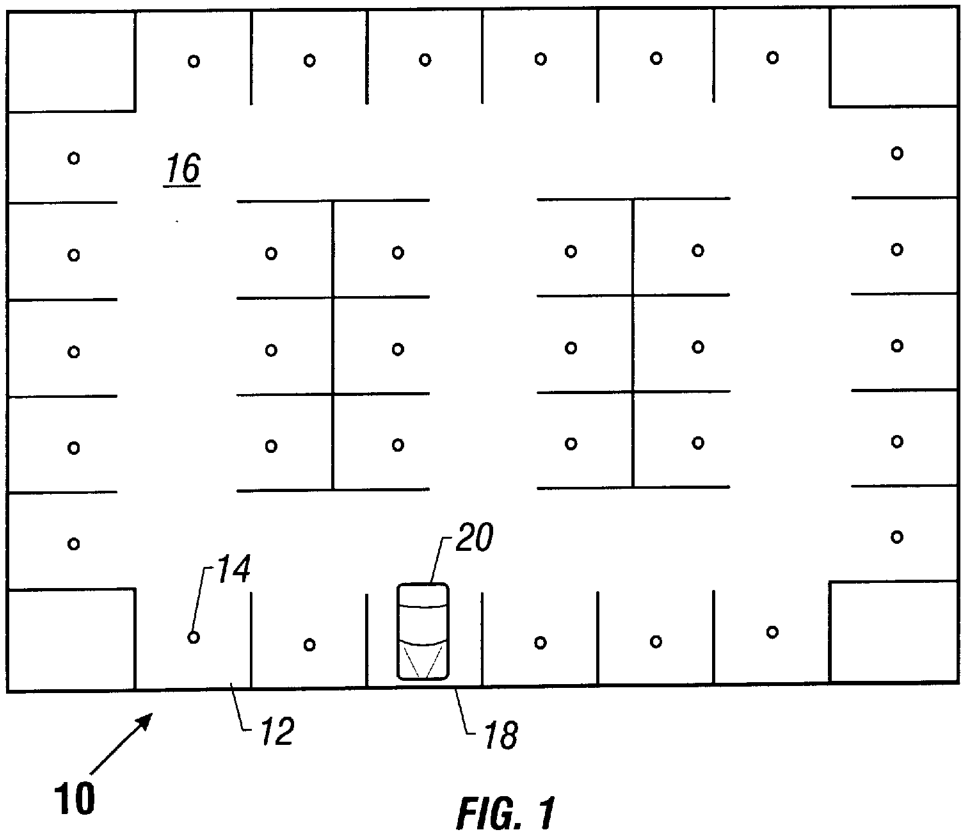
FIG. 1 is a top plan view of a parking lot in accordance with one embodiment of the present invention.

A storage facility 10, shown in FIG. 1 such as a parking lot, warehouse, or parts storage facility, may include a number of available spaces 12 for storing items. In one embodiment of the present invention, the facility 10 is a parking lot and the storage spaces 12 are parking spaces. However, the present invention is not limited to an embodiment involving parking spaces and parking lots.

Each space includes a detector 14 that detects the absence of an item in an available space. In a parking lot application, the detector 14 may detect the absence of a vehicle in the parking space. The detector 14 may use any convenient technology, including an infrared detector which transmits an infrared beam and determines if the beam is reflected back from an item. The detector 14 may also use motion detection technology to determine the availability of a space. The detector 14 may also use a load sensor or other techniques to determine whether an item is absent from the available space 12.

In addition, the facility 10 may include passageways 16 to access spaces 12. An entrance 18 may be used to access the available spaces 12. For example, a vehicle 20 may enter and traverse the passageways 16 to locate an available space 12.

Figure 2:
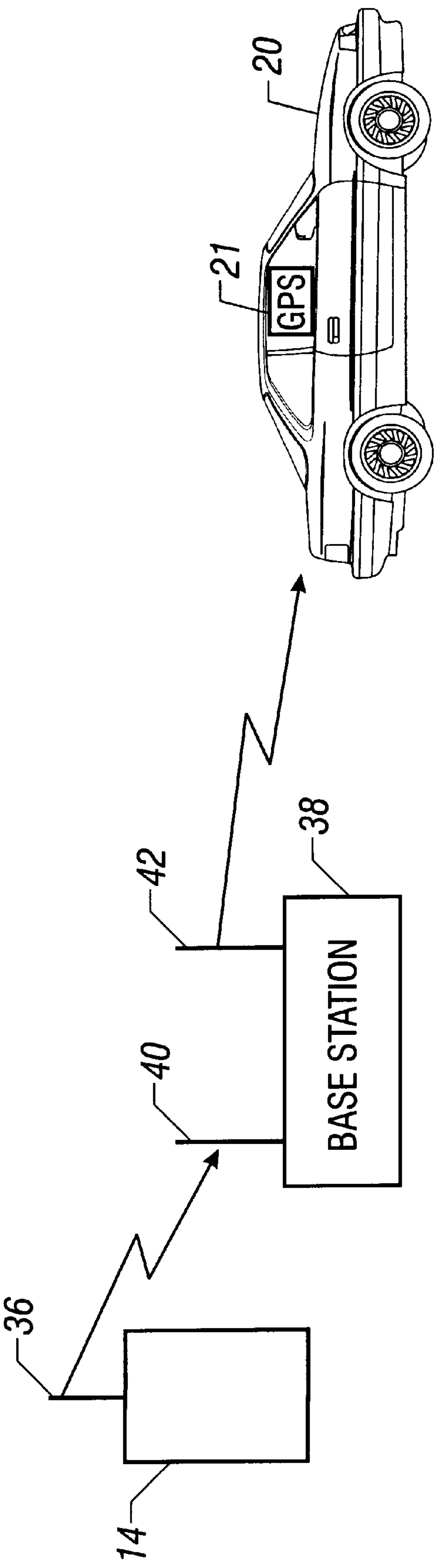
FIG. 2 is a display of an in car computer system in accordance with one embodiment of the present invention.

Referring to FIG. 2, each of the detectors 14 may include an antenna 36 which transmits information about the absence of an item in space to a base station 38. In one embodiment, a digital camera depiction of an available space may be captured and provided to the base station 38. The base station 38 may include an antenna 40 that receives the information from the detector 14. The transmission of information between the detector 14 and the base station 38 may use wired or wireless communication techniques. For example, radio wave communication may be utilized between each detector 14 and a base station 38. The base station 38 may in turn include an antenna 42 that transmits information about the availability of spaces 12 to an operator 20 which may be a vehicle in the case of a parking lot application. The base station 38 may convert an identifier for a particular space into its global positioning system coordinates in one embodiment of the invention.

While the system is illustrated as using an intervening base station 38, where the operator 20 is equipped with a processor-based system, the information may be transmitted directly from the detectors 14 to the operator 20. The operator 20 may then use a processor-based system to assemble the information.

Figure 3:
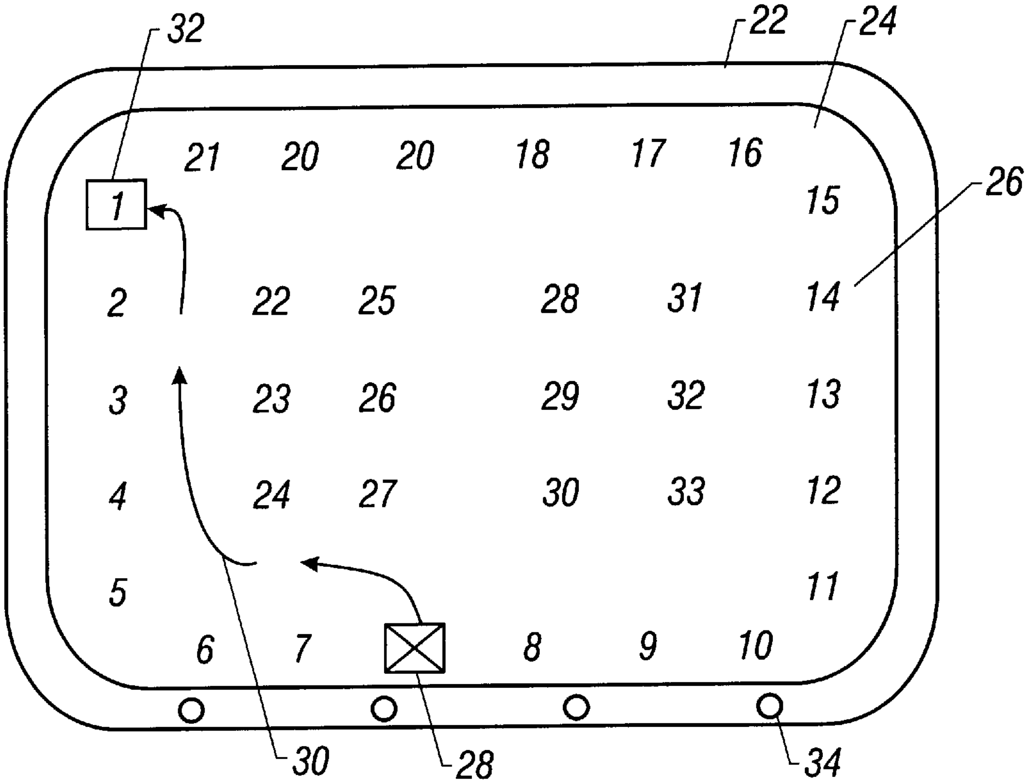
FIG. 3 is a schematic depiction of one embodiment of the present invention.

Turning now to FIG. 3, a processor-based system 22 illustrated as an in car personal computer system, includes a display 24. The display 24 may show a simplified map of the available spaces 12 using mapping software. In this example, to conserve space, the spaces are identified by numbers. If the operator 20 includes a global positioning system or other position identifying technology, the operator 20 may be indicated as an overlay or graphical user interface 28 on the display 22. In this way, the user determines his or her own position relative to an available space indicated by highlighting 32. In this case, the system determines the best route to access the available space 32 (marked number one) and indicates this by arrows 30 suggesting a course to follow to most efficiently arrive at the space 32. Controls 34 may be provided on the housing of the system 22.

Figure 4:
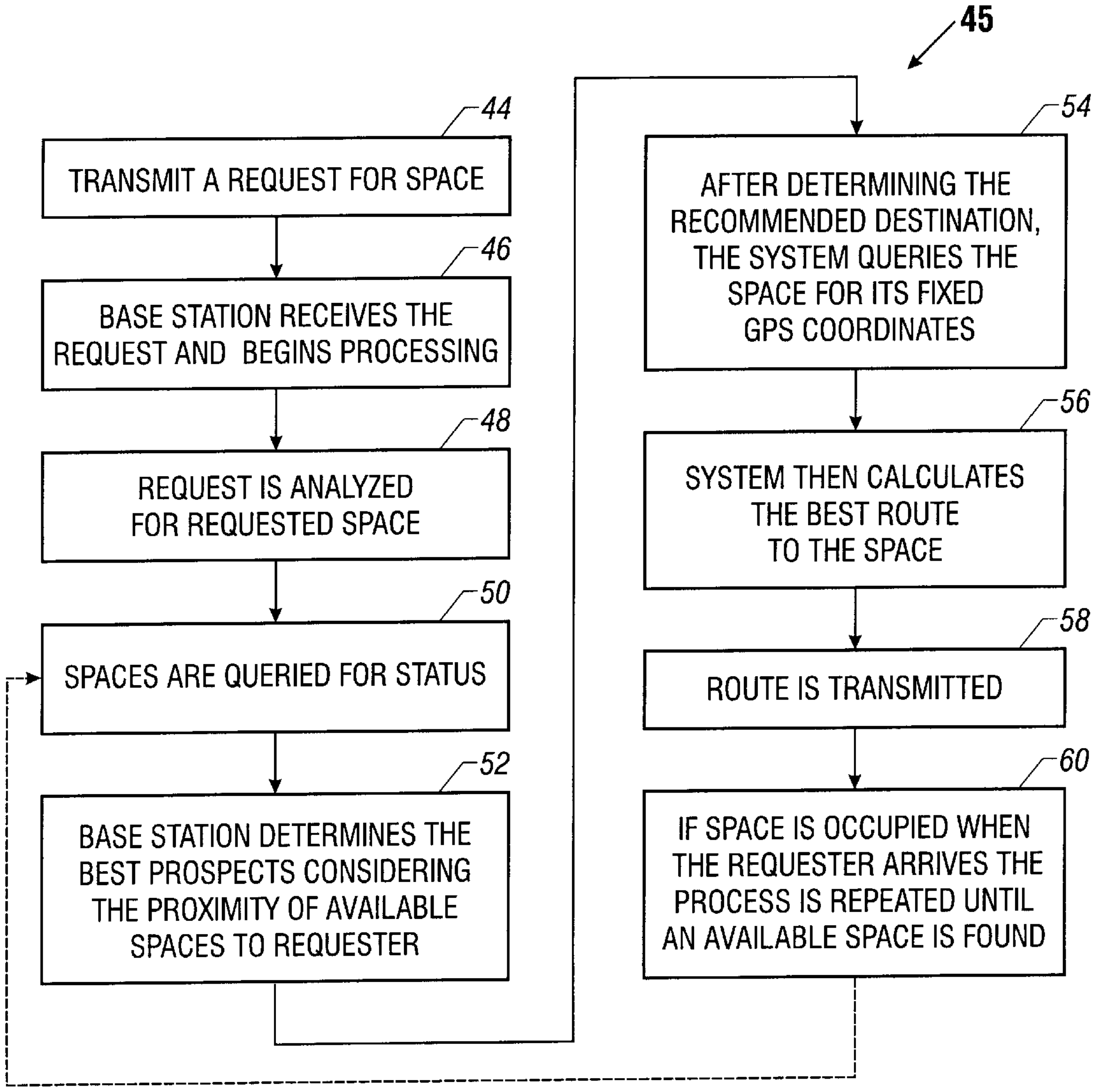
FIG. 4 is a flow chart for software for one embodiment of the present invention.

Referring to FIG. 4, software 45 for implementing one embodiment of the present invention begins by transmitting a request for an available parking space for an operator 20 to the base station 38 as indicated at block 44. The base station 38 receives the request and begins processing it as indicated in block 46. The request is analyzed for a requested space as indicated in block 48.

The base station 38 then queries the spaces 12 for status as indicated in block 50. In one embodiment of the present invention, the spaces may be indicated as occupied or unoccupied. This information is provided by the detectors 14 and transmitted to the base station 38.

The base station 38 then determines the best space prospects considering the proximity of any available spaces to the requester (block 52). The requester's location may be received from the requester. That is, the requester may include a global positioning system (GPS) which determines the requester's location and provides it over a wireless link, for example to the base station 38.

After determining the recommended destination, the system determines the fixed GPS coordinates of the recommended space as indicated in block 54. The system then calculates the best route to the space, as indicated in block 56. The route is transmitted to the requester as indicated in block 58. If the space is occupied when the requester arrives, the process is repeated until an available space is found, as indicated in block 60. Also, the system may determine an alternative space in case the user is not satisfied with the original recommendation.

Figure 5:
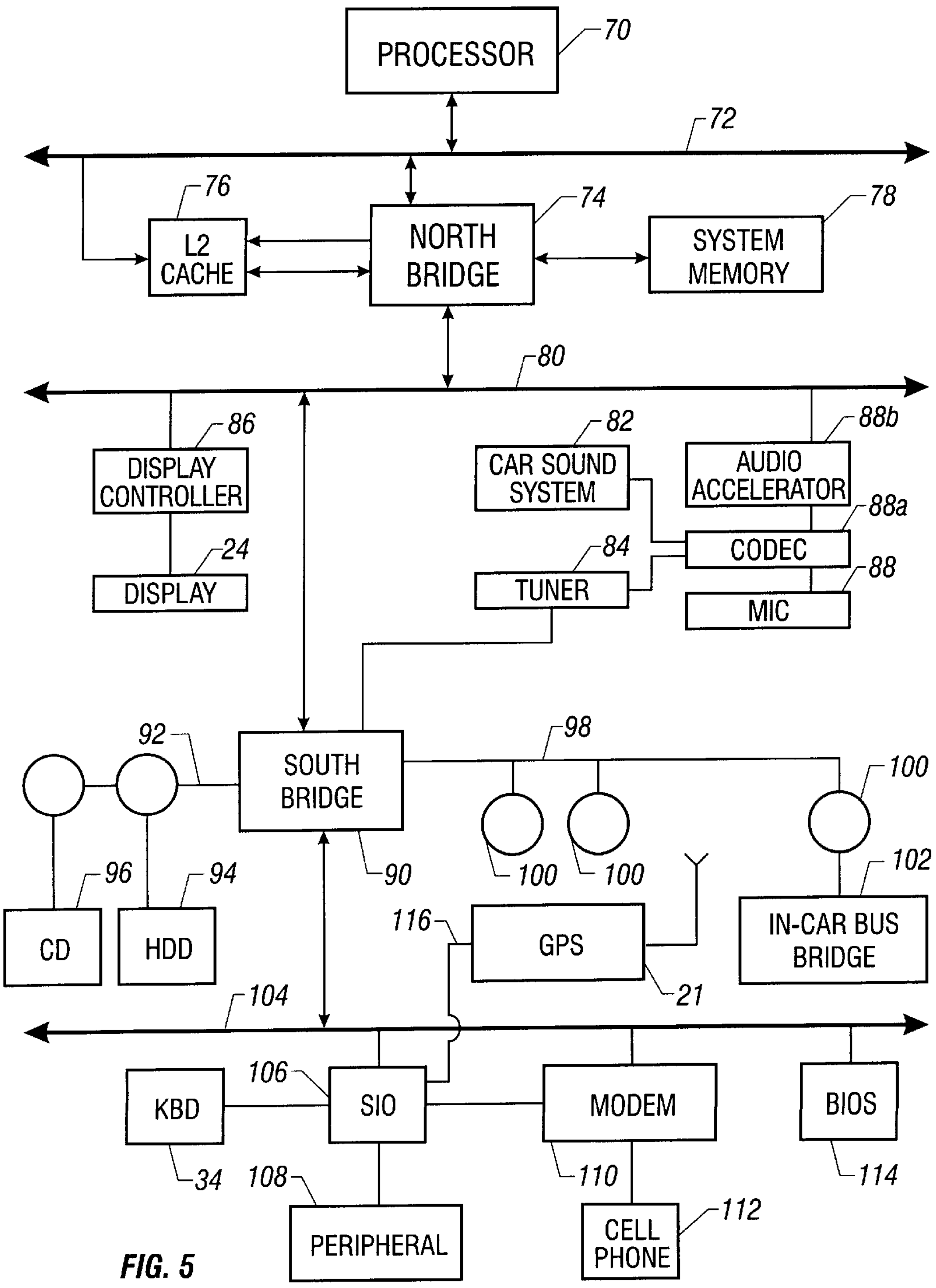
FIG. 5 is a block diagram of hardware for implementing one embodiment of the invention shown in FIG. 2.

One embodiment of a processor-based system for implementing the capabilities previously described on the vehicle may use a processor-based system located in the vehicle's dashboard. The system illustrated in FIG. 5 may be implemented, for example, by the Intel 8243TX PCI chipset. Other chipsets may be used as well.

A processor 70 communicates across a host bus 72 to a bridge 74, an L2 cache 76 and system memory 78. The bridge 74 may communicate with a bus 80, which could, for example, be a Peripheral Component Interconnect (PCI) bus in accordance with Revision 2.1 of the PCI Electrical Specification available from the PCI Special Interest Group, Portland, Ore. 97214. The bus 80, in turn, may be coupled to a display controller 86, which may drive a display 24 in one embodiment of the invention.

A microphone input 88 may lead to the audio-codec (AC'97) 88*a* where it may be digitized and sent to memory through an audio accelerator 88*b*. The AC'97 Specification is available from Intel Corporation (www.developer.intel.com/pc-supp/webform/ac97). A tuner 84 may be controlled from a bus bridge 90. The output of the tuner 84 may be sent to system memory 78 or mixed in the codec 88*a* and sent to the car sound system 82. Sounds generated by the processor 70 may be sent to the audio accelerator 88*b* and the AC'97 codec 88*a* to the car sound system 82.

The bus 80 may be coupled to a bus bridge 90 and may have an extended integrated drive electronics (EIDE) coupling 92 and a Universal Serial Bus (USB) coupling 98 (i.e., a device compliant with the Universal Serial Bus Implementers Forum Specification Version 1.0 (www.usb.org)). Finally, the USB connection 98 may couple to a series of USB hubs 100. One of these hubs may couple to an in-car bus bridge 102 that may, for example, use the controller area network (CAN) protocol or the Society of Automotive Engineers J1850 standard. The in-car bus provides communication between microcontrollers that control vehicle operation. The other hubs may be available for implementing additional functionality.

The EIDE connection 92 may couple to a hard disk drive 94 and CD-ROM player 96. In some systems, it may be desirable to replace the hard disk drive with other memory forms. For example, a flash memory may be used in place of the drive 94. The memory may be implemented, for example, by a 28F200 two megabyte flash memory, available from Intel Corporation.

The bridge 90 in turn may be coupled to an additional bus 104, which may couple to a serial interface 106 which drives a peripheral 108, a keyboard 34, a modem 110 coupled to a cellular phone 112 and a basic input/output system (BIOS) memory 114. The GPS receiver 21 may be attached by a cable 116 to a serial port on the serial I/O device 106.

USB hubs 100 may be implemented using 8093HX microcontroller, available from Intel Corporation. Local firmware may be stored on EPROM memory (e.g., the 27C256 EPROM, available from Intel Corporation).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:

a detector that provides information about the presence of an item in a given space;

a receiver that receives information about the availability of a plurality of spaces; and a display that displays the positions of available spaces and the position of a user, wherein said display includes a map of the available spaces and the position of the user.

2. The system of claim 1 including a base station which communicates with a plurality of detectors using a wireless communication technique.

3. The system of claim 1 wherein said detectors include position sensing devices, said detectors providing information about the location of said detector and about the availability of the space associated with the detector.

4. The system of claim 1 wherein said detectors are contained in a parking facility, and said display is part of an in car personal computer system.

5. The system of claim 4 including a global positioning system device associated with said in car personal computer system such that the position of said spaces and said in car personal computer system may be displayed using mapping software.

6. The system of claim 5 including software to provide directions from the current location of the in car personal computer system to the available parking space.

7. A system comprising:

an in-vehicle display to display information about the location of an available parking space on a map; and a position identifying device, coupled to said display, to enable the position of the display to be displayed on the map that also displays the available parking space.

8. The system of claim 7, including a detector to detect the absence of a vehicle in an available space and a transmission system to transmit information about the available space.

9. The system of claim 8, wherein said detector includes a transmitter to transmit information for use by said display.

10. The system of claim 8, including a base station that receives information from a plurality of detectors and provides the information to said display.

11. A system of claim 8, wherein said transmission system is a wireless transmission system that receives wireless information from said detector and provides that information to a display over a wireless communication link.

12. The system of claim 8, wherein said display is a processor-based system that is capable of assembling information received by said transmission system from a plurality of detectors and displaying information about an available parking space.

13. The system of claim 12, wherein said display is part of an in-car personal computer system.

14. A method comprising:

displaying information about the location of an available parking space on a map; and identifying the position of a vehicle relative to the available parking space on said map.

15. The method of claim 14 including detecting the absence of a vehicle in an available space and transmitting information about the availability of the space.

16. The method of claim 15 including transmitting information over a wireless link.

17. The method of claim 16 including transmitting global positioning system coordinates of the space with said transmission.

18. The system of claim 15 including transmitting the information to an intermediate station that then transmits the information about a plurality of spaces.

19. The method of claim 15 including transmitting the information for display in an in-car personal computer system.

20. The method of claim 13 including assembling information for displaying using mapping software and displaying the position of the user relative to the position of the available space.

21. The method of claim 20 including receiving information about the global positioning coordinates of an available space and the global positioning coordinates of an in-car personal computer system and displaying relative positions of said space and said in-car personal computer system using mapping software.

22. The method of claim 14 including providing information about the absence of a vehicle in the parking space and transmitting said information to other vehicle operators, and displaying said information on a mapping display showing the positions of the available parking spaces and the receiving vehicle's position.

23. A system comprising:

a detector that provides information about the presence of a vehicle in a given parking space;

a receiver that receives information about the availability of a plurality of spaces, said receiver including a global positioning system device; and a display that displays the positions of available spaces and the position of the user using mapping software.

24. The system of claim 23 including software to provide directions from the current location of the receiver to the available parking space.

* * * * *